(12) United States Patent
Wu et al.

(10) Patent No.: US 11,803,110 B2
(45) Date of Patent: Oct. 31, 2023

(54) PROJECTION DEVICE

(71) Applicants: Coretronic Corporation, Hsin-Chu (TW); Coretronic Reality Incorporation, Hsinchu County (TW)

(72) Inventors: Chun-Hsien Wu, Hsin-Chu (TW); Kun-Chen Hsu, Hsin-Chu (TW); Shih Kang Lin, Hsin-Chu (TW); Jung-Ya Hsieh, Hsin-Chu (TW)

(73) Assignees: Coretronic Corporation, Hsin-Chu (TW); Coretronic Reality Incorporation, Hsinchu County (TW)

( * ) Notice: Subject to any disclaimer, the term of this patent is extended or adjusted under 35 U.S.C. 154(b) by 0 days.

(21) Appl. No.: 17/696,814

(22) Filed: Mar. 16, 2022

(65) Prior Publication Data

US 2022/0334456 A1 Oct. 20, 2022

(30) Foreign Application Priority Data

Apr. 14, 2021 (CN) .......................... 202110400549.X
May 28, 2021 (CN) .......................... 202110591601.4

(51) Int. Cl.
*G03B 21/14* (2006.01)
*G03B 21/28* (2006.01)

(52) U.S. Cl.
CPC ......... *G03B 21/142* (2013.01); *G03B 21/145* (2013.01); *G03B 21/28* (2013.01)

(58) Field of Classification Search
CPC .... G03B 21/145; G03B 21/142; G03B 21/14; G03B 21/28; G03B 21/10; G03B 21/58
See application file for complete search history.

(56) References Cited

U.S. PATENT DOCUMENTS

| 10,321,104 | B2 * | 6/2019 | Ma | G03B 21/28 |
| 2008/0284988 | A1 * | 11/2008 | Kobayashi | G03B 21/28 |
| | | | | 359/223.1 |
| 2010/0328551 | A1 * | 12/2010 | Iwamasa | G09B 27/00 |
| | | | | 348/744 |

FOREIGN PATENT DOCUMENTS

| CN | 203225028 | | 10/2013 |
| CN | 207690320 | | 8/2018 |
| JP | 2009230155 A | * | 10/2009 |
| TW | 200527117 | | 8/2005 |
| TW | 201028786 | | 8/2010 |

* cited by examiner

*Primary Examiner* — Ryan D Howard
(74) *Attorney, Agent, or Firm* — JCIPRNET (57) ABSTRACT

A projection device configured to provide multiple projection modes is provided. The projection device includes a housing module and a projection module. The housing module includes a display screen and multiple protective walls. The display screen includes a display curved surface. The projection module includes an optomechanical assembly and a light guide assembly. In a first projection mode, the optomechanical assembly projects an image light beam to the light guide assembly along a first axis. The light guide assembly projects the image light beam to the display curved surface along a second axis, where the first axis and the second axis are not parallel to each other. In a second projection mode, the light guide assembly is moved out of a transmission path of the image light beam, so that the image light beam is directly projected out of the projection device.

16 Claims, 9 Drawing Sheets

FIG. 5B

PROJECTION DEVICE

CROSS-REFERENCE TO RELATED APPLICATION

This application claims the priority benefit of China application serial no. 202110400549.X, filed on Apr. 14, 2021 and China application serial no. 202110591601.4, filed on May 28, 2021. The entirety of each of the above-mentioned patent applications is hereby incorporated by reference herein and made a part of this specification.

BACKGROUND

Technical Field

The invention relates to an optical device, and particularly relates to a projection device.

Description of Related Art

The existing projection technology adopts front projection or rear projection to project an image light beam onto a projection screen with a certain distance from the projector, so that a user may view image information projected on the projection screen. However, the above projection method requires a larger installation space. If it is only for the purpose of small-scale image display, or it hopes to rely on the projector to implement local indoor layout, the conventional projector type is not suitable. Therefore, other techniques that directly project an image on an exterior part are also developed: a projection light beam is incident to a haze sphere on the exterior part, and an image is displayed on the sphere by a principle of rear projection. In this way, the device is only required to be placed in a space required for displaying, it may display various images via the sphere to attract users' attention while occupying a very small space.

However, although the above spherical projection may solve the problem of space occupation, it only has a spherical projection function, and lacks the function of projecting images to a large screen implemented by the conventional projector. For the users, to purchase a specific device for this single sphere projection function that is bound to be used with low frequency is not cost-effective.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The invention is directed to a projection device configured to provide a plurality of projection modes.

An embodiment of the invention provides a projection device configured to provide a plurality of projection modes. The projection device includes a housing module and a projection module. The housing module includes a display screen and a plurality of protective walls, wherein the display screen and the plurality of protective walls surround an accommodating space. The display screen includes a display curved surface. The projection module is arranged in the accommodating space and includes an optomechanical assembly and a light guide assembly, wherein the light guide assembly is movably disposed on one of the plurality of protective walls. In a first projection mode, the optomechanical assembly projects an image light beam to the light guide assembly along a first axis. The light guide assembly projects the image light beam to the display curved surface along a second axis, wherein the first axis and the second axis are not parallel to each other. In a second projection mode, the light guide assembly is moved out of a transmission path of the image light beam, so that the image light beam projected by the optomechanical assembly along the first axis is directly projected out of the projection device.

Based on the above description, in an embodiment of the invention, since the light guide assembly of the projection device is designed to be movably disposed on one of the protective walls, the projection device is configured to provide multiple projection modes. Compared with a conventional spherical projector, the projection device of the embodiment of the invention not only has the advantage of a smaller usage space of the spherical projector, but also provides multiple projection modes, thereby increasing a utilization rate of the projection device.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
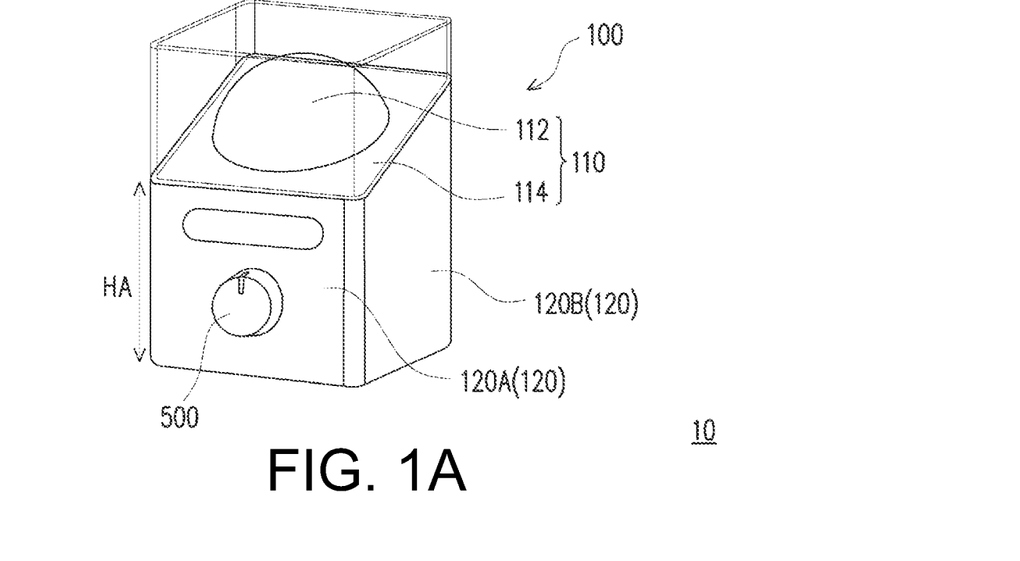
FIG. 1A is a schematic three-dimensional view of a projection device according to a first embodiment of the invention.
Figure 1B:
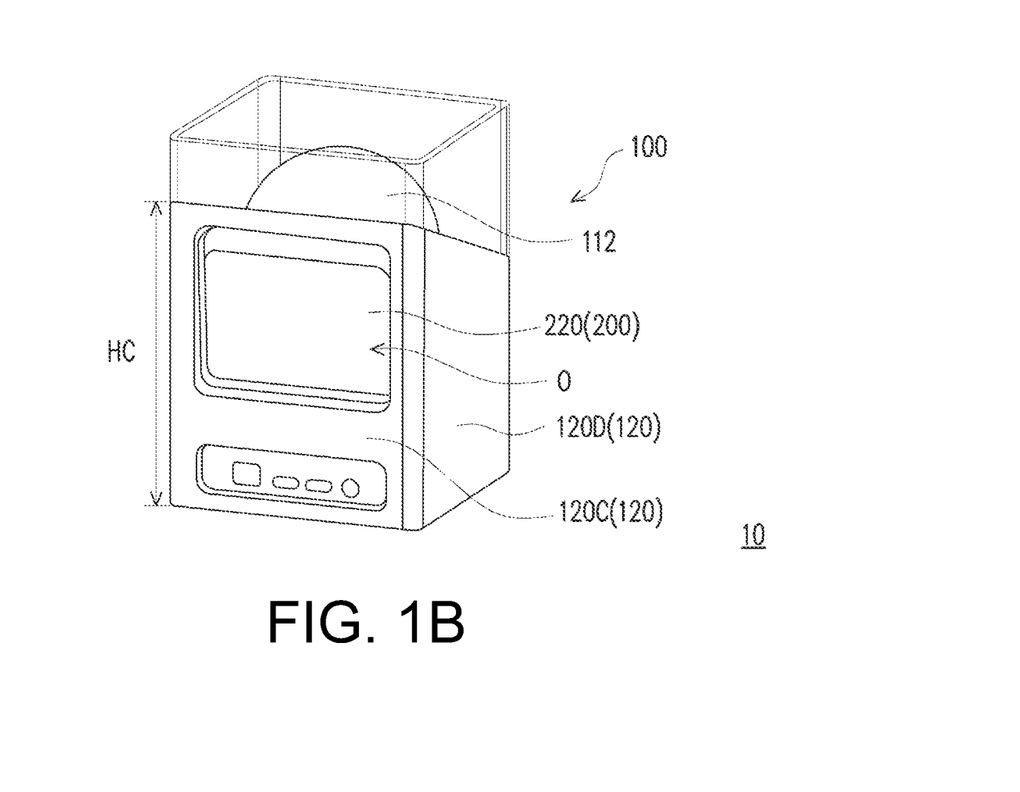
FIG. 1B is a schematic three-dimensional view of the projection device in another viewing angle according to the first embodiment of the invention.
Figure 1C:
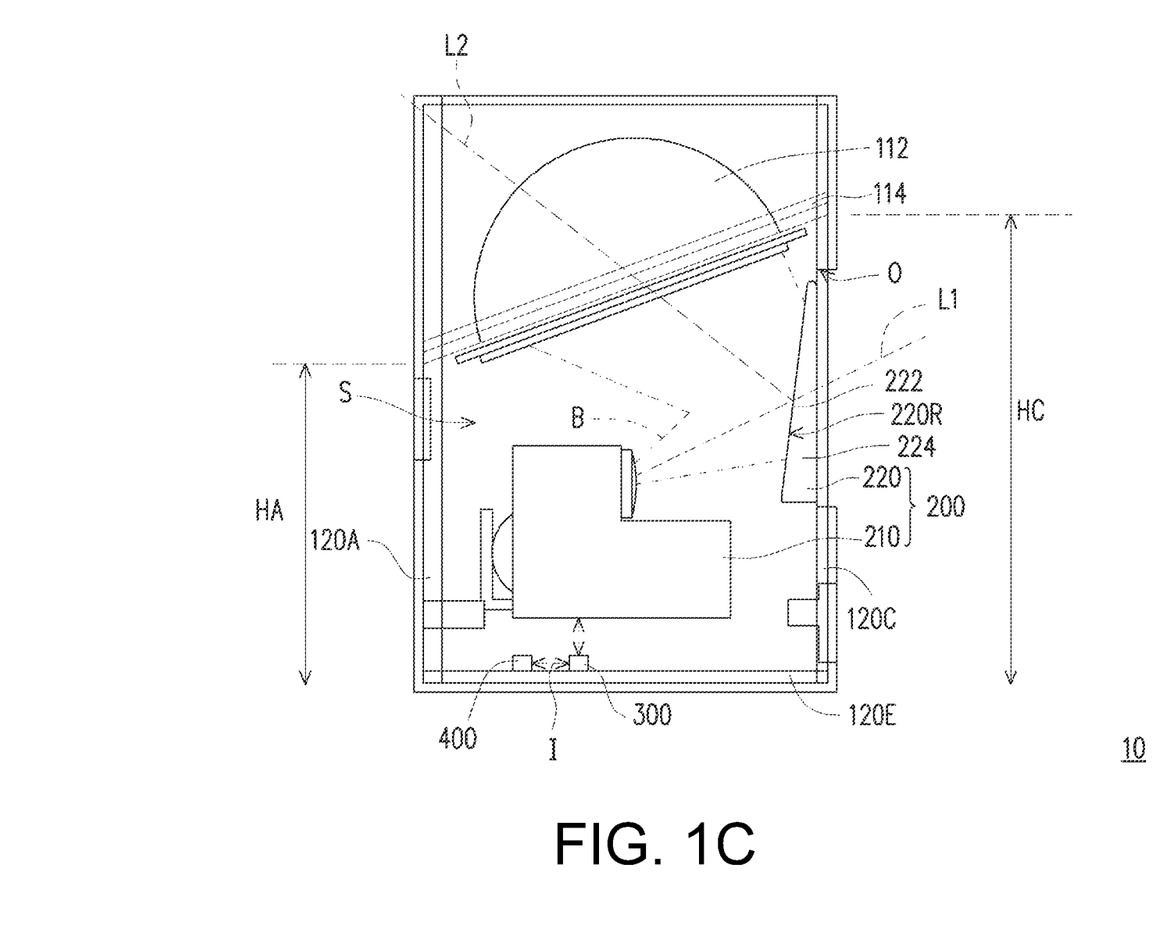
FIG. 1C is a schematic cross-sectional view of the projection device in a first projection mode according to the first embodiment of the invention.

FIG. 1A is a schematic three-dimensional view of a projection device according to a first embodiment of the invention. FIG. 1B is a schematic three-dimensional view of the projection device in another viewing angle according to the first embodiment of the invention. FIG. 1C is a schematic cross-sectional view of the projection device in a first projection mode according to the first embodiment of the invention. Referring to FIG. 1A, FIG. 1B and FIG. 1C, an embodiment of the invention provides a projection device 10 configured to provide a plurality of projection modes. The projection device 10 includes a housing module 100 and a projection module 200. The housing module 100 includes a display screen 110 and a plurality of protective walls 120. The plurality of protective walls 120 include, for example, protective walls 120A, 120B, 120C, 120D, and 120E, where the display screen 110 and the protective walls 120 surround an accommodating space S. In the embodiment, the projection device 10 may further include a transparent protective cover, which is disposed on the display screen 110, for example, to cover the display screen 110 to protect the display screen 110. The transparent protective cover is, for example, made of a transparent material.

In the embedment, a material of the protective walls 120 may be plastic, metal or other suitable materials. The protective wall 120A, the protective wall 120B, and the display screen 110 are respectively opposite to the protective wall 120C, the protective wall 120D, and the protective wall 120E. The display screen 110 is connected to the protective walls 120A, 120B, 120C, and 120D, and the protective wall 120C is connected to the display screen 110, the protective walls 120B, 120D, and 120E. In the embodiment, a height HA of the protective wall 120A relative to the protective wall 120E is smaller than a height HC of the protective wall 120C relative to the protective wall 120E, so that the display screen 110 is inclined relative to the protective wall 120E.

In the embodiment, the display screen 110 includes a display curved surface 112. The curvature of the display curved surface 112 may be positive (such as a convex curved surface), negative (such as a concave curved surface), zero (such as a plane), or indefinite (such as an ellipsoid or a wavy curved surface), and the curvature and shape of the display curved surface 112 are not particularly limited. The projection module 200 is disposed in the accommodating space S (in the first projection mode) and includes an optomechanical assembly 210 and a light guide assembly 220 (the optomechanical assembly 210 is disposed in the accommodating space S in the first projection mode and the second projection mode). The optomechanical assembly 210 may include a light source (not shown in the figure), a light modulator (not shown in the figure), a projection lens (not shown in the figure), and various optical elements for collimation, beam expansion, beam contraction, light spot adjustment, etc., in an optical path. In addition, the light guide assembly 220 is movably disposed on one of the plurality of protective walls 120A, 120B, 120C, and 120D. In the embodiment, the protective wall 120C is provided with an opening O, and the light guide assembly 220 is disposed on the protective wall 120C, and may be switched to cover or not cover the opening O.

In detail, in the first projection mode of the embodiment, the light guide assembly 220 covers the opening O, and the optomechanical assembly 210 projects an image light beam B to the light guide assembly 220 along a first axis L1. The light guide assembly 220 guides the image light beam B to the display curved surface 112 along a second axis L2, where the first axis L1 and the second axis L2 are not parallel to each other. In particular, the first axis of the invention refers to the direction of an image light beam projected by the optomechanical assembly, and the first axis and the second axis are the transmission directions of the main light beam (or the center light beam) of the image light beam.

Figure 1D:
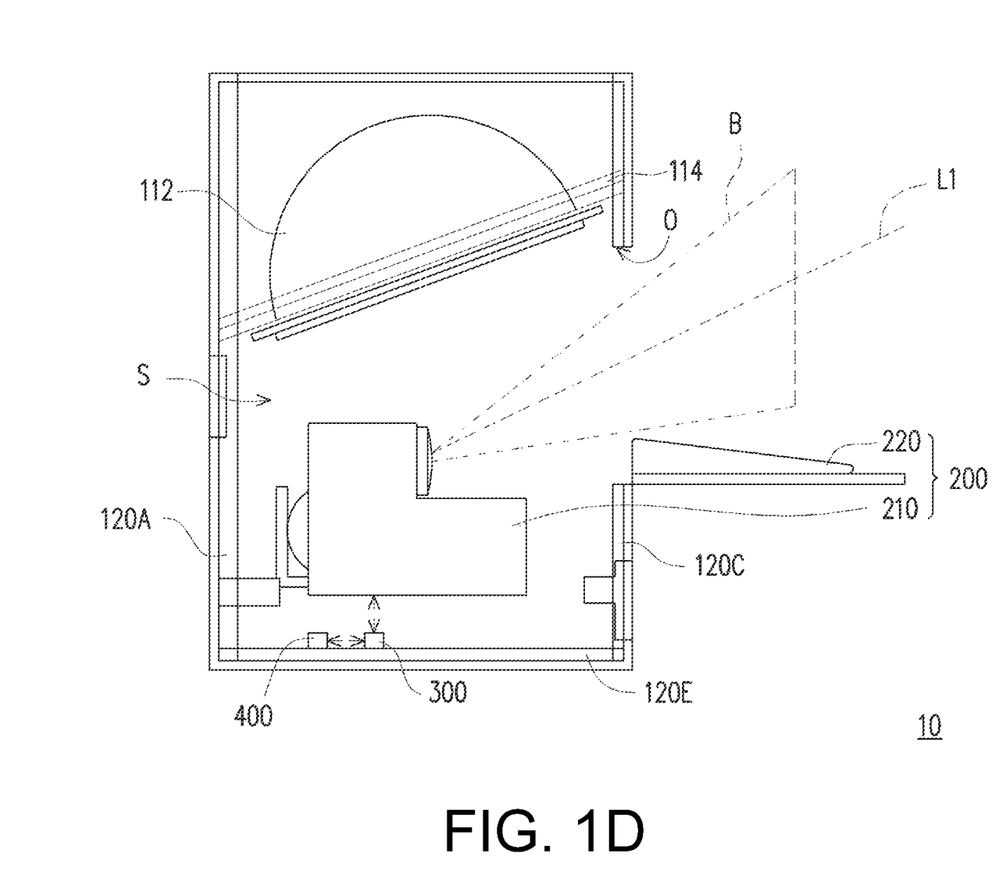
FIG. 1D is a schematic cross-sectional view of the projection device in a second projection mode according to the first embodiment of the invention.

FIG. 1D is a schematic cross-sectional view of the projection device in a second projection mode according to the first embodiment of the invention. Referring to FIG. 1D, in the second projection mode, the light guide assembly 220 is moved out of the transmission path of the image light beam B, i.e., the light guide assembly 220 does not cover the opening O, so that the image light beam B projected by the optomechanical assembly 210 along the first axis L1 is directly projected out of the projection device 10 after passing through the opening O. In the embodiment, the light guide assembly 220 is moved out of the transmission path of the image light beam B after being, for example, rotated relative to the protective wall 120C. A part of the light guide assembly 220 is connected to the opening O (the protective wall 120C) by mechanical members such as a shaft, a buckle, a clasp, etc., and the light guide assembly 220 is moved out of the transmission path of the image light beam B through the rotation of these mechanical members. The above-mentioned rotation is, for example, a rotation of the light guide assembly 220 toward the outside of the projection device 10.

In the embodiment, the first axis L1 and the protective walls 120A, 120B, 120C, 120D, and 120E are not perpendicular to each other. The second axis L2 and the protective walls 120A, 120B, 120C, 120D, and 120E are not perpendicular to each other.

In the embodiment, the display curved surface 112 is a part of a spherical surface, such as a hemisphere, a ⅓ sphere, a ⅔ sphere, and so on. However, the invention is not limited thereto. In another embodiment, the display curved surface 112 may be a complete spherical surface.

In the embodiment, the display screen 110 also includes an upper cover 114. The upper cover 114 (for example, a plate with an opening) is connected between the display curved surface 112 and the protective walls 120A, 120B, 120C, and 120D. The upper cover 114 is preferably made of an opaque material to shield the components disposed in the accommodating space S. For example, the material of the upper cover 114 includes a high-reflectivity material, such as a reflector. The high-reflectivity material (or reflector) is, for example, disposed on a surface of the upper cover 114 at a side away from the accommodating space S. When the projection device 10 is in the first projection mode, the upper cover 114 made of the high-reflectivity material may reflect a part of the light transmitted from the display curved surface 112, thus allowing the user to have a visual extension effect when viewing from the outside of the projection device 10, so as to increase a projection effect (i.e., visual experience).

Further, an included angle between the upper cover 114 and one of the protective walls 120A, 120B, 120C, and 120D provided with the light guide assembly 220 (for example, the protective wall 120C of the embodiment) is between 60 degrees and 80 degrees.

In the embodiment, the light guide assembly 220 includes a reflector 222 having a reflective surface 220R, and the reflector 222 may be moved out of or into the opening O of the protective wall 120C. In the embodiment, an included angle between the reflective surface 220R and the upper cover 114 is within a range of 50 degrees to 70 degrees. In other words, the reflective surface 220R may be parallel or non-parallel to the protective wall 120C, which is not specifically limited by the invention. In the embodiment, the light guide assembly 220 may further include a protective plate 224, the reflector 222 is disposed on the protective plate 224, and the light guide assembly 220 is, for example, disposed on the protective wall 120C via the protective plate 224.

In the embodiment, the display curved surface 112 is preferably made of a light-transmitting material with a haze, so that a viewer located on one side of the display curved surface 112 may see the image light beam B (i.e., an image is displayed on the display curved surface 112) projected by the optomechanical assembly 210 disposed on the other side of the display curved surface 112. For example, the display curved surface 112 includes a transparent substrate and a diffusion layer stacked on each other. The haze of the diffusion layer is within a range of 60% to 80%.

In an embodiment, the display curved surface 112 may include a transparent substrate mixed with a plurality of diffusion particles. Particle diameters of the plurality of diffusion particles are within a range of 3 μm to 20 μm.

In an embodiment, the projection device 10 further includes a control element 300 and a sensor 400 (shown in FIG. 1C and FIG. 1D). The control element 300 and the sensor 400 are disposed in the accommodating space S, where the control element 300 is electrically connected to the sensor 400 and the optomechanical assembly 210.

In an embodiment, the control element 300 includes, for example, a central processing unit (CPU), a microprocessor, a digital signal processor (DSP), a programmable controller, a programmable logic device (PLD), or other similar devices or a combination of these devices, which is not limited by the invention. In addition, in an embodiment, each function of the control element 300 may be implemented as a plurality of program instructions. These program instructions may be stored in a storage unit, and the control element 300 executes these program instructions. Alternatively, in an embodiment, each function of the control element 300 may be implemented as one or more circuits. The invention does not limit the use of software or hardware to implement the various functions of the control element 300.

In addition, in an embodiment, the sensor 400 may generate an input signal I, and the projection device 10 adjusts a projection parameter of the optomechanical assembly 210 according to the input signal I. The sensor 400 is, for example, a vibration sensor, a light sensor, or a sound sensor. The input signal I is, for example, a signal generated through a manner such as vibration, clapping, a sound, touch, etc., and the projection parameter is, for example, power on/off, a playback mode, or playback content, etc. When the control element 300 receives the input signal I from the sensor 400, the controller 300 may control the optomechanical assembly 210 to adjust the projection parameter of the optomechanical assembly 210 according to the input signal I.

In an embodiment, the projection device 10 further includes an operating element 500 (shown in FIG. 1A). The operating element 500 is disposed on the protective wall 120A, but it is not particularly limited by the invention, and the operating element 500 may be disposed at any position that is convenient for the user to operate. The operating element 500 is, for example, a knob. The control element 300 is electrically connected to the operating element 500. Therefore, the user may switch the projection parameter of the optomechanical assembly 210 through the operating element 500 and the control element 300.

Based on the above description, in an embodiment of the invention, since the projection device 10 includes the display screen 110, the protective walls 120A, 120B, 120C, 120D, 120E, the optomechanical assembly 210, and the light guide assembly 220, the light guide assembly 220 is designed to be movably disposed on one of the protective walls 120A, 120B, 120C, and 120D, so that the projection device 10 may provide multiple projection modes. For example, in the first projection mode (rear projection: spherical projection mode), the light guide assembly 220 guides the image light beam B onto the display curved surface 112 of the display screen 110. In the second projection mode (direct projection mode), the light guide assembly 220 is moved out of the transmission path of the image light beam B, and the image light beam B is directly projected out of the projection device 10. Compared with the conventional spherical projector, the projection device 10 of the embodiment of the invention not only has the advantage of a smaller space for the spherical projector, but also provides multiple projection modes, so that the utilization rate of the projection device 10 may be increased.

Figure 2:
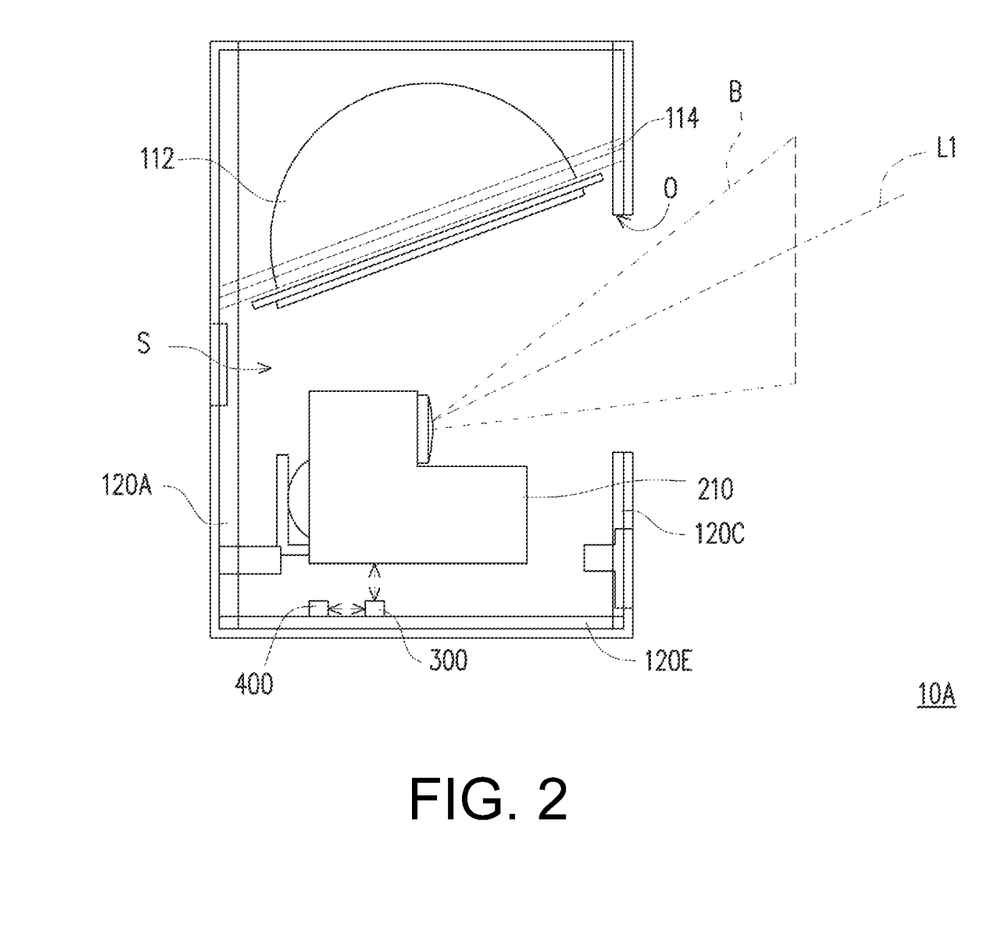
FIG. 2 is a schematic cross-sectional view of a projection device in the second projection mode according to a second embodiment of the invention.

FIG. 2 is a schematic cross-sectional view of a projection device in the second projection mode according to a second embodiment of the invention. Referring to FIG. 1C, FIG. 1D and FIG. 2, a difference between a projection device 10A of FIG. 2 and the projection device 10 of FIG. 1C only lies in a connection method of the light guide assembly and the protective wall 120C. The first projection mode of the projection device 10A is similar to the first projection mode of the projection device 10 of FIG. 1C, and detail thereof is not repeated. Main differences between the second projection mode of the projection device 10A and the second projection mode of the projection device 10 of FIG. 1D are as follows. In the embodiment, the light guide assembly (for example, the light guide assembly 220 of FIG. 1C) of the projection device 10A and the protective wall 120C are separable. The light guide assembly is temporarily arranged at the opening O (in the first projection mode) through, for example, magnetic attraction or a pop-up design, etc., so that when the projection device 10A is in the second projection mode, the light guide assembly 220 is separated from the protective wall 120C, and the light guide assembly 220 is moved out of the transmission path of the image light beam B. The advantages of the projection device 10A are similar to those of the projection device 10, and details thereof are not repeated. In other embodiments, the light guide assembly 220 of the projection device 10A may slide relative to the protective wall 120C, for example, the light guide assembly 220 slides in a direction/an opposite direction that the optomechanical assembly 210 faces the display curved surface 112 through a sliding rail, so that the light guide assembly 220 is moved out of the transmission path of the image light beam B.

Figure 3A:
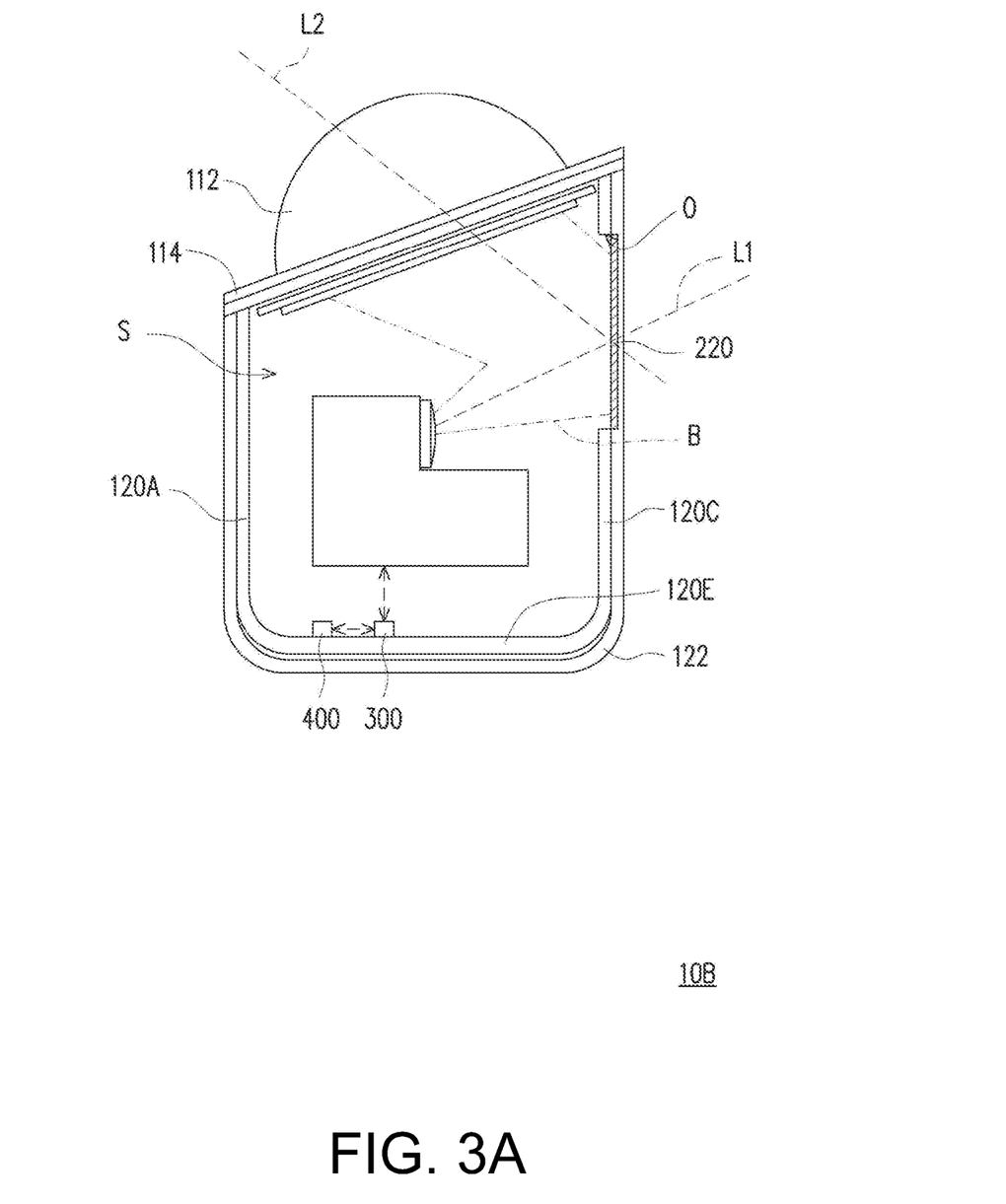
FIG. 3A is a schematic cross-sectional view of a projection device in the first projection mode according to a third embodiment of the invention.
Figure 3B:
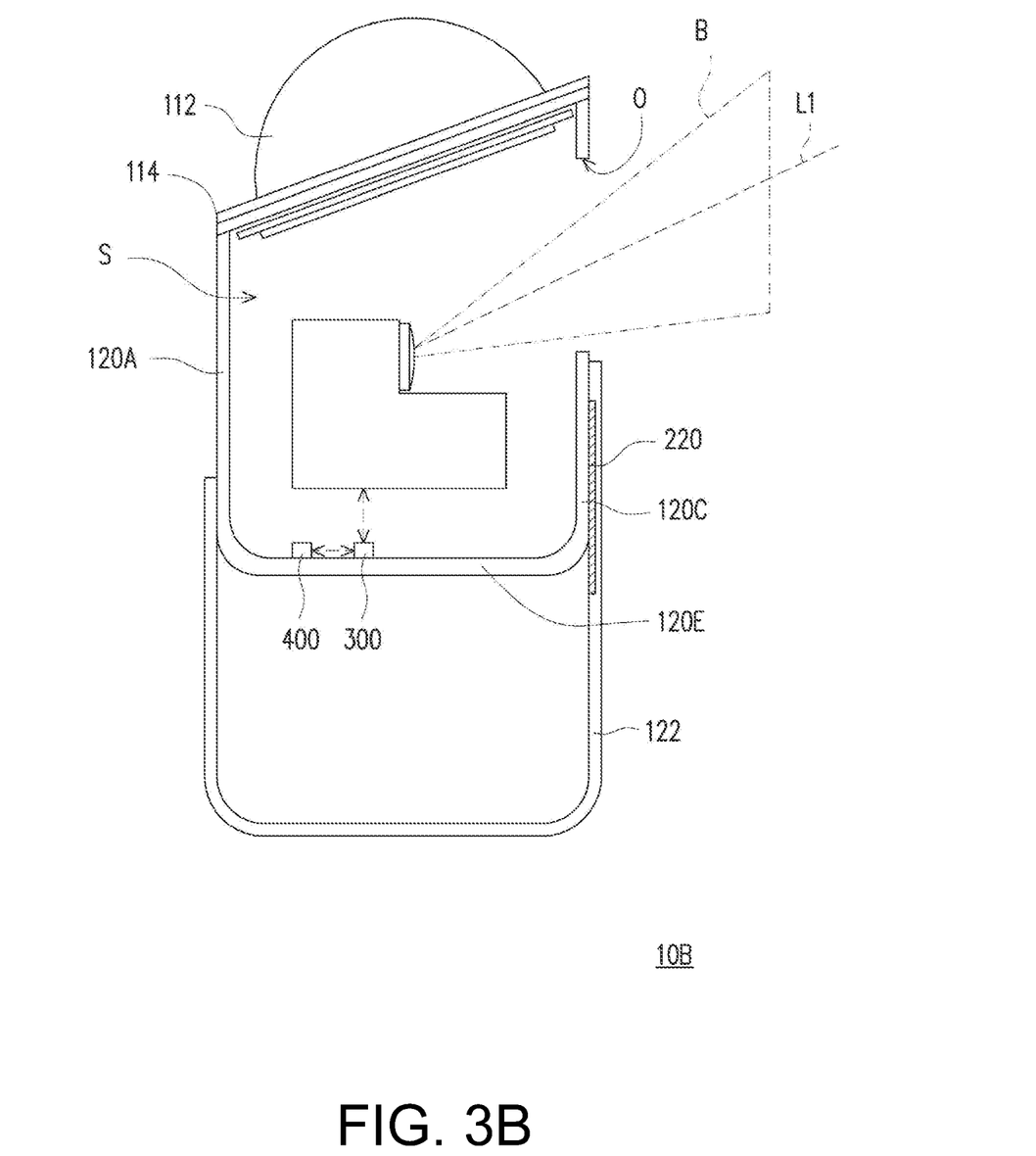
FIG. 3B is a schematic cross-sectional view of the projection device in the second projection mode according to the third embodiment of the invention.

FIG. 3A is a schematic cross-sectional view of a projection device in the first projection mode according to a third embodiment of the invention. FIG. 3B is a schematic cross-sectional view of the projection device in the second projection mode according to the third embodiment of the invention. Referring to FIG. 3A and FIG. 3B, a projection device 10B of FIG. 3A is similar to the projection device 10 of FIG. 1C, and main differences there between are as follows. In the embodiment, the protective walls 120 further include an outer side wall 122. The outer side wall 122 is slidably sleeved (for example, by using a sliding rail) outside at least one of the protective walls 120A, 120B, 120C, 120D, and 120E (for example, one of the protective walls 120 provided with the opening O). In the embodiment, the outer side wall 122 is, for example, sleeved outside the protective walls 120A, 120C, and 120E. The light guide assembly 220 is disposed on the outer side wall 122. Through sliding of the outer side wall 122 relative to the protective walls 120A and 120C, the light guide assembly 220 is moved out of or into the transmission path of the image light beam B. When the light guide assembly 220 is moved into the transmission path of the image light beam B (i.e., the light guide assembly 220 covers the opening O), as shown in FIG. 3A, the projection device 10B is used to provide the first projection mode. When the light guide assembly 220 is moved out of the transmission path of the image light beam B, as shown in FIG. 3B, the projection device 10B is used to provide the second projection mode.

Based on the above content, the projection device 10B of the above embodiment of the invention is, for example, arranged in a recess of a desk or a display table, and the outer side wall 122 is, for example, an inner wall of the recess of the desk or the display table, but the invention is not limited thereto. When the projection device 10B is raised out of the desktop, it may provide direct projection (the second projection mode). When the projection device 10B is descended, it may provide a spherical projection (the first projection mode). The other advantages of the projection device 10B are similar to those of the projection device 10, which are not repeated.

Figure 4:
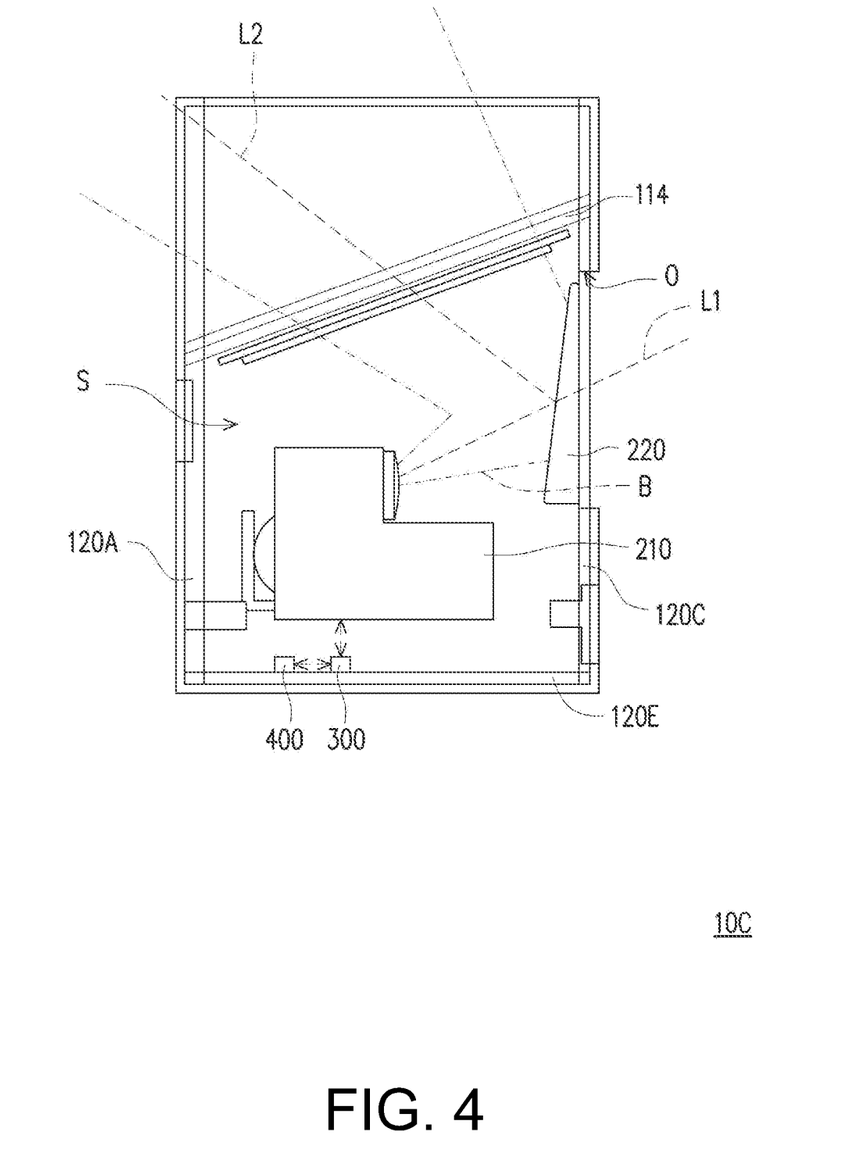
FIG. 4 is a schematic cross-sectional view of a projection device in a third projection mode according to a fourth embodiment of the invention.

FIG. 4 is a schematic cross-sectional view of a projection device in a third projection mode according to a fourth embodiment of the invention. Referring to FIG. 1C and FIG. 4, a projection device 10C of FIG. 4 is similar to the projection device 10 of FIG. 1C, and main differences there between are as follows. In the embodiment, the display screen of the projection device 10C (for example, the display curved surface 112 of FIG. 1C) is a detachable member or a movable member, and FIG. 4 schematically shows a status that the display screen of the projection device 10C has been removed or moved. In the third projection mode, the display screen is moved out of the transmission path of the image light beam B, and the optomechanical assembly 210 projects the image light beam B to the light guide assembly 220 along the first axis L1. The image light beam B is then directly projected out of the projection device 10C along the second axis L2 by the light guide assembly 220. Except for providing the third projection mode, the other advantages of the projection device 10C are similar to those of the projection device 10, which are not repeated.

Figure 5A:
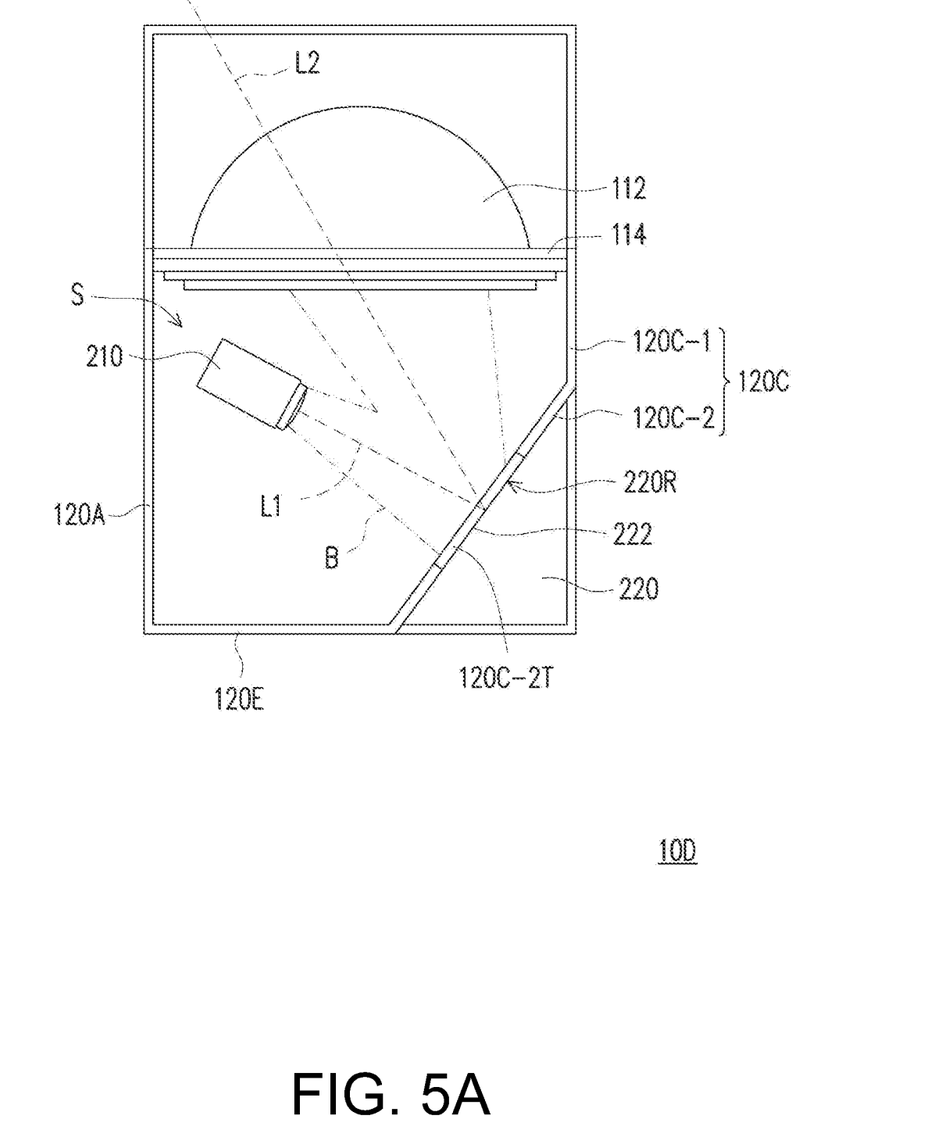
FIG. 5A is a schematic cross-sectional view of a projection device in the first projection mode according to a fifth embodiment of the invention.
Figure 5B:
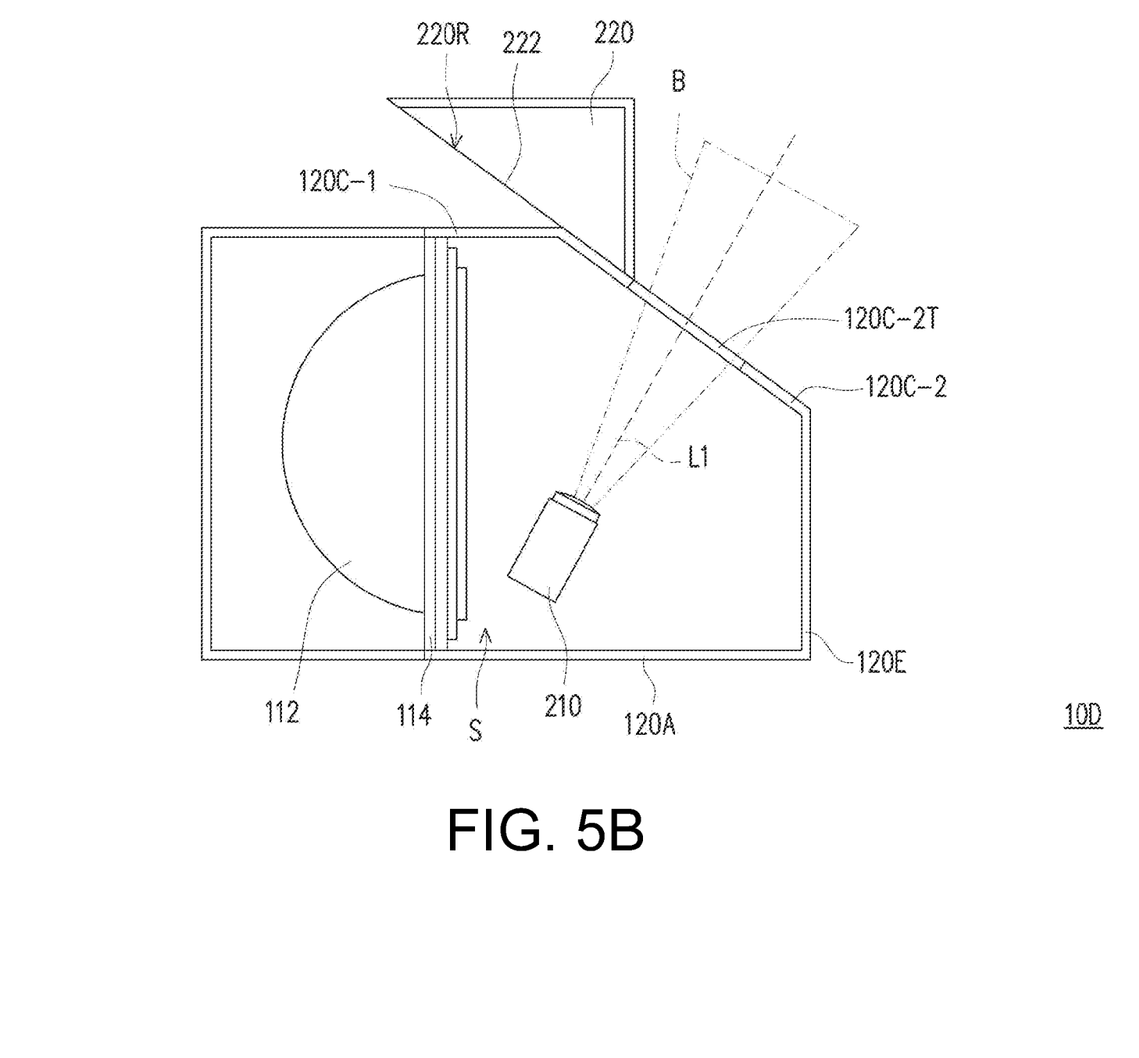
FIG. 5B is a schematic cross-sectional view of the projection device in the second projection mode according to the fifth embodiment of the invention.

FIG. 5A is a schematic cross-sectional view of a projection device in the first projection mode according to a fifth embodiment of the invention. FIG. 5B is a schematic cross-sectional view of the projection device in the second projection mode according to the fifth embodiment of the invention. Referring to FIG. 5A and FIG. 5B, a projection device 10D of FIG. 5A is similar to the projection device 10 of FIG. 1C, and main differences there between are as follows. In the embodiment, the upper cover 114 of the display screen 110 and one of the protective walls 120A, 120B, 120C, and 120D provided with the light guide assembly 220 (for example, a part of the protective wall 120C in the embodiment) are perpendicular to each other. Furthermore, the upper cover 114 is perpendicular to all the protective walls 120A, 120B, 120C, and 120D.

In the embodiment, the included angle between the reflective surface 220R of the light guide assembly 220 and the upper cover 114 is within a range of 35 degrees to 55 degrees. Moreover, the included angle between the reflective surface 220R and one of the protective walls 120A, 120B, 120C, and 120D provided with the light guide assembly 220 (for example, the protective wall 120C of the embodiment) is within a range of 35 degrees to 55 degrees.

In detail, in the embodiment, one of the protective walls 120A, 120B, 120C, and 120D provided with the light guide assembly 220 (for example, the protective wall 120C of the embodiment) includes a first planar portion 120C-1 and a second planar portion 120C-2. Specifically, the first planar portion 120C-1 of the protective wall 120C and the upper cover 114 are connected and perpendicular to each other, the first planar portion 120C-1 is connected to the second planar portion 120C-2, and the light guide assembly 220 is slidably sleeved outside of the second planar portion 120C-2. By sliding the light guide assembly 220 relative to the second planar portion 120C-2, the light guide assembly 220 is moved out of or into the transmission path of the image light beam B. In the first projection mode, an included angle (obtuse angle) between the reflective surface 220R of the light guide assembly 220 and the first planar portion 120C-1 is within a range of 125 degrees to 145 degrees, and the reflective surface 220R is, for example, parallel to the second planar portion 120C-2, as shown in FIG. 5A. In the second projection mode, the included angle (acute angle) between the reflective surface 220R of the light guide assembly 220 and the first planar portion 120C-1 is within a range of 35 degrees to 55 degrees, and the reflective surface 220R is, for example, parallel to the second planar portion 120C-2, as shown in FIG. 5B. Moreover, the second planar portion 120C-2 includes a light-transmitting flat plate 120C-2T. In the second projection mode, the image light beam B penetrates the light-transmitting flat plate 120C-2T to be projected out of the projection device 10D. The advantages of the projection device 10D are similar to those of the projection device 10, and are not repeated. It is particularly noted that although the light guide assembly 220 is shown as having a triangular appearance in the embodiment and moving in a sliding manner, the invention is not limited thereto. The light guide assembly 220 of the invention only needs to include the reflector 222 including the reflective surface 220R. The appearance of the light guide assembly 220 is not particularly limited, and the moving manner of the light guide assembly 220 is also not particularly limited.

In summary, in an embodiment of the invention, since the projection device includes the display screen, the protective walls, the optomechanical assembly and the light guide assembly, and the light guide assembly is designed to be movably disposed on one of the protective walls, the projection device is configured to provide multiple projection modes. Compared with a conventional spherical projector, the projection device of the embodiment of the invention not only has the advantage of a smaller usage space of the spherical projector, but also provides multiple projection modes, thereby increasing a utilization rate of the projection device.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the disclosure is intended to be dedicated to the public regardless of whether the element or component is explicitly recited in the following claims.

What is claimed is:

1. A projection device, configured to provide a plurality of projection modes and comprising a housing module and a projection module, wherein:
    the housing module comprises a display screen and a plurality of protective walls, wherein the display screen and the plurality of protective walls surround an accommodating space, and the display screen comprises a display curved surface;
    the projection module is disposed in the accommodating space and comprises an optomechanical assembly and a light guide assembly, wherein the light guide assembly is movably disposed on one of the plurality of protective walls;
    in a first projection mode, the optomechanical assembly projects an image light beam to the light guide assembly along a first axis, and the light guide assembly guides the image light beam to the display curved surface along a second axis, wherein the first axis and the second axis are not parallel to each other; and
    in a second projection mode, the light guide assembly is moved out of a transmission path of the image light beam, so that the image light beam projected by the optomechanical assembly along the first axis is directly projected out of the projection device,
    wherein the display screen further comprises an upper cover connected between the display curved surface and the plurality of protective walls, and a material of the upper cover comprises a high-reflectivity material.

2. The projection device as claimed in claim 1, wherein the first axis and the plurality of protective walls are not perpendicular to each other, and the second axis and the plurality of protective walls are not perpendicular to each other.

3. The projection device as claimed in claim 1, wherein the display curved surface is a complete spherical surface or a part of the spherical surface.

4. The projection device as claimed in claim 1, wherein an included angle between the upper cover and one of the plurality of protective walls provided with the light guide assembly is within a range of 60 degrees to 80 degrees.

5. The projection device as claimed in claim 1, wherein the light guide assembly further comprises a reflector with a reflective surface, and an included angle between the reflective surface and the upper cover is within a range of 50 degrees to 70 degrees.

6. The projection device as claimed in claim 1, wherein the display curved surface comprises a transparent substrate and a diffusion layer stacked on each other, and a haze of the diffusion layer is within a range of 60% to 80%.

7. The projection device as claimed in claim 1, wherein the display curved surface comprises a transparent substrate mixed with a plurality of diffusion particles, and particle diameters of the plurality of diffusion particles are within a range of 3 μm to 20 μm.

8. The projection device as claimed in claim 1, wherein the display screen is a detachable member or a movable member, in a third projection mode, the display screen is moved out of the transmission path of the image light beam, so that the optomechanical assembly projects the image light beam to the light guide assembly along the first axis, and the image light beam is then directly projected out of the projection device along the second axis by the light guide assembly.

9. The projection device as claimed in claim 1, wherein the plurality of protective walls further comprise an outer side wall, the outer side wall is slidably sleeved outside at least one of the plurality of protective walls, the light guide assembly is disposed on the outer side wall, and through sliding of the outer side wall relative to the plurality of protective walls, the light guide assembly is moved out of or into the transmission path of the image light beam.

10. The projection device as claimed in claim 1, wherein the light guide assembly is configured to slide or rotate relative to the protective wall, or the light guide assembly is configured to be separated from the protective wall.

11. The projection device as claimed in claim 1, further comprising a sensor disposed in the accommodating space, wherein the sensor is configured to generate an input signal, and the projection device adjusts a projection parameter of the optomechanical assembly according to the input signal.

12. A projection device, configured to provide a plurality of projection modes and comprising a housing module and a projection module, wherein:
the housing module comprises a display screen and a plurality of protective walls, wherein the display screen and the plurality of protective walls surround an accommodating space, and the display screen comprises a display curved surface;
the projection module is disposed in the accommodating space and comprises an optomechanical assembly and a light guide assembly, wherein the light guide assembly is movably disposed on one of the plurality of protective walls;
in a first projection mode, the optomechanical assembly projects an image light beam to the light guide assembly along a first axis, and the light guide assembly guides the image light beam to the display curved surface along a second axis, wherein the first axis and the second axis are not parallel to each other; and
in a second projection mode, the light guide assembly is moved out of a transmission path of the image light beam, so that the image light beam projected by the optomechanical assembly along the first axis is directly projected out of the projection device,
wherein the display screen further comprises an upper cover, the upper cover is connected between the display curved surface and the plurality of protective walls, and the upper cover and one of the plurality of protective walls provided with the light guide assembly are perpendicular to each other.

13. The projection device as claimed in claim 12, wherein the light guide assembly further comprises a reflector with a reflective surface, and an included angle between the reflective surface and the upper cover is within a range of 35 degrees to 55 degrees.

14. The projection device as claimed in claim 12, wherein one of the plurality of protective walls provided with the light guide assembly comprises a first planar portion and a second planar portion, the light guide assembly is slidably sleeved outside the second planar portion, and by sliding the light guide assembly relative to the second planar portion, the light guide assembly is moved out of or into the transmission path of the image light beam.

15. The projection device as claimed in claim 14, wherein the light guide assembly further comprises a reflector with a reflective surface, and an included angle between the reflective surface and the first planar portion is within a range of 35 degrees to 55 degrees.

16. The projection device as claimed in claim 14, wherein the second planar portion comprises a light-transmitting flat plate, and in the second projection mode, the image light beam penetrates the light-transmitting flat plate to be projected out of the projection device.

* * * * *